United States Patent
Nilsson et al.

(10) Patent No.: US 12,485,859 B2
(45) Date of Patent: Dec. 2, 2025

(54) BRAKE SYSTEM FOR A VEHICLE AND METHOD FOR BRAKING

(71) Applicant: Haldex Brake Products Aktiebolag, Landskrona (SE)

(72) Inventors: Anders Nilsson, Landskrona (SE); Anders Lindqvist, Landskrona (SE)

(73) Assignee: Haldex Aktiebolag, Landskrona (SE)

( * ) Notice: Subject to any disclaimer, the term of this patent is extended or adjusted under 35 U.S.C. 154(b) by 276 days.

(21) Appl. No.: 18/113,504

(22) Filed: Feb. 23, 2023

(65) Prior Publication Data
US 2023/0202437 A1    Jun. 29, 2023

Related U.S. Application Data

(63) Continuation of application No. PCT/EP2021/007291, filed on Aug. 18, 2021.

(30) Foreign Application Priority Data

Aug. 24, 2020 (CN) .......................... 202010856820.6

(51) Int. Cl.
*B60T 8/171* (2006.01)

(52) U.S. Cl.
CPC .......... *B60T 8/171* (2013.01); *B60T 2240/00* (2013.01); *B60T 2270/402* (2013.01); *B60T 2270/413* (2013.01); *B60T 2270/416* (2013.01)

(58) Field of Classification Search
CPC ................. B60T 8/171; B60T 2240/00; B60T 2270/402; B60T 2270/413; B60T 2270/416
See application file for complete search history.

(56) References Cited

U.S. PATENT DOCUMENTS

| | | | |
|---|---|---|---|
| 2009/0192689 A1 | 7/2009 | Dunn | |
| 2012/0226469 A1* | 9/2012 | Premkumar | B60T 8/172 702/148 |
| 2019/0135273 A1* | 5/2019 | Safstrom | G01P 3/481 |
| 2019/0393954 A1* | 12/2019 | Perdew | A61K 31/4745 |
| 2020/0132192 A1 | 4/2020 | Oh | |
| 2022/0041058 A1 | 2/2022 | Nemeth | |

FOREIGN PATENT DOCUMENTS

| | | | |
|---|---|---|---|
| EP | 3 623 242 A1 | 3/2020 | |
| WO | WO-2024126043 A1 * | 6/2024 | G06F 3/011 |

* cited by examiner

*Primary Examiner* — Andrew J Cromer
(74) *Attorney, Agent, or Firm* — Price Heneveld LLP

(57) ABSTRACT

The present invention relates to a brake system for a vehicle and a method for braking. The brake system includes a control module and an electromechanical brake that provides braking force to a wheel. The control module receives rotation speed information of at least one drive motor, which provides a driving torque to the vehicle, and wheel speed sensor information of at least one wheel, and compares the refresh rate of the rotation speed information of the drive motor and that of the wheel speed sensor information of the wheel, such that a wheel rotational speed generated from the information of a higher refresh rate will be used. The brake system provided by the present invention can obtain a more accurate wheel speed, thereby improving the control of the vehicle.

20 Claims, 9 Drawing Sheets refresh time of the wheel speed sensor information vs. refresh time of the rotation speed information of the drive motor

BRAKE SYSTEM FOR A VEHICLE AND METHOD FOR BRAKING

CROSS REFERENCE TO RELATED APPLICATIONS

This application is a continuation of International Application PCT/EP2021/072921 with an international filing date of Aug. 18, 2021 and claiming priority to co-pending Chinese Patent Application No. CN 202010856820.6 entitled "Brake system for a vehicle and method for braking", filed on Aug. 24, 2020.

FIELD OF THE INVENTION

The invention relates to the field of vehicle braking, in particular to an electromechanical brake system and a method for braking using the same.

BACKGROUND OF THE INVENTION

A brake system of a vehicle is usually provided with a wheel speed sensor for measuring a rotational speed of a wheel, thereby acquiring a real-time driving state of the vehicle, and activating a dynamic control function such as an anti-lock braking system (i.e., ABS), an anti-slip regulation (i.e., ASR), and an electronic stability control (i.e., ESC) when necessary. Furthermore, the rotational speed of a wheel may additionally also be provided to a higher-level control system in addition to the brake system, such as a Vehicle Control Unit (VCU), a driver assistance system, an autonomous driving system, etc.

However, some wheel speed sensors currently used have a problem of low accuracy when the wheel rotational speed is low, resulting in a large error in the wheel rotational speed calculated from the wheel speed information obtained by the wheel speed sensor when the vehicle speed is low. An example of this is shown in FIG. 1. As shown, when the vehicle speed is, for example, 30 km/h, the refresh rate of the wheel speed sensors is less than 2 milliseconds, and when the vehicle speed is reduced to 5 km/h, the refresh rate of the wheel speed sensor will increase to over 9 milliseconds. Therefore, in a low speed situation, the refresh rate of the signal output by the wheel speed sensor is reduced, so that the signal output by the wheel speed sensor may not reflect the real dynamic characteristics of the wheel, thereby affecting the judgment of the control module of the vehicle brake system.

Therefore, it is felt necessary to provide an improved brake system for a vehicle, which overcomes the above-mentioned drawbacks of the prior art and obtains accurate wheel dynamic characteristics.

Further prior art is described in US patent applications US 2019/0135273 A1, US 2012/0226469 A1, US 2009/0192689 A1, European patent application EP 3 623 242 A1, corresponding to US patent application US 2022/0041058 A1, and US patent application US 2020/0132192 A1.

SUMMARY OF THE INVENTION

The present invention proposes a brake system for a vehicle comprising a control module and an electromechanical brake (EMB) providing braking force to a wheel, wherein the control module receives rotation speed information of at least one drive motor, which provides a driving torque to the vehicle, and wheel speed sensor information of at least one wheel, and compares the refresh rate of the rotation speed information of the drive motor and that of the wheel speed sensor information of the wheel, such that a wheel rotational speed generated from the information of a higher refresh rate will be used.

With the novel brake system and method for braking a vehicle, it is e.g. possible to provide an accurate wheel rotational speed even when the vehicle speed is low and/or improves the control of the vehicle.

The brake system might use a wheel rotational speed generated from the one of a higher refresh rate between the rotation speed information of the drive motor and the wheel speed sensor information of the wheel. This ensures that the obtained wheel rotational speed is accurate, i.e. it can reflect the real wheel dynamic characteristics and helps the control module of the brake system to determine correctly.

Specifically, for example, the rotation speed information of the drive motor collected by a drive motor sensor and the wheel speed sensor information collected by a wheel speed sensor provided at least one wheel are sent to a control module of the brake system. The control module then compares the refresh rate of the rotation speed information of the drive motor and that of the wheel speed sensor information of the wheel. When the wheel speed sensor information refresh rate of the wheel is higher, the brake system naturally uses the rotational speed of the wheel generated from the wheel speed sensor information of the wheel, and when the wheel speed sensor information refresh rate of the wheel is lower, for example, when the vehicle speed is slow, the wheel speed sensor information refresh rate of the wheel is correspondingly low, the control module then use generates the wheel rotational speed with the rotation speed information of the drive motor, which is of a higher refresh rate.

In this context, generating the rotational speed of the wheel means that the control module obtains the rotational speed of the respective wheel by calculating the received information by means of a program stored therein and/or by signal processing of the received signal, for example, the wheel speed sensor information.

The brake system can be applicable to various power arrangements of a vehicle including a vehicle in which the drive motor drives the wheels through a differential, and also a vehicle in which the at least one drive motor is at least one pair of drive motors, i.e. at least two drive motors, and a pair of wheels of the vehicle are driven by the at least one pair of drive motors independently from one another. For the latter, it is contemplated herein both two-wheel drive and four-wheel independent drive.

The drive motor of the vehicle comprises an internal combustion engine and an electric motor. The drive motor provides a driving torque for running to the vehicle, drives the wheels in motion, and is controlled by a drive motor controller. In particular, the drive motor controller comprises a motor control unit and a motor drive. The motor control unit and the motor drive can be provided independently from each other, for example, the motor control unit integrated in the control module of the brake system or in the vehicle control unit (VCU). For full electric vehicles or hybrid vehicles using an electric motor as a drive motor, the motor control unit is the motor control unit of the vehicle, and it is the Engine Control Unit (ECU) of the vehicle for an internal combustion engine.

The brake system directly adopts electric energy as a power source, and the electric energy is converted into friction braking force acting on wheels through a braking motor and a mechanical transmission mechanism so as to apply service brake and parking brake. A number of control modules of the brake system may be provided, for example, in correspondence with the axles, based on a redundant architecture, each of the control modules controlling a part of the electric brakes in normal, and being capable of independently controlling the entire brake system in an emergency case. The control module may include, for example, an anti-lock braking function (ABS), an electronic stability control function (ESC), an anti-slip regulation function (ASR), and the like.

Preferably, the control module of the brake system is configured such that, when the wheel rotational speed generated from the rotation speed information of the drive motor is used, it will use the wheel rotational speed generated from the wheel speed sensor information of the wheel for validation or vice versa. The above validation enhances the reliability of the wheel speed obtained by the brake system.

Preferably, a value could be preset for the deviation of the wheel rotational speed generated from the rotation speed information of the drive motor from that generated from the wheel speed sensor information of the wheel. The preset value can be an absolute value. If the difference between the two wheel rotational speeds is greater than the preset value, it can be determined that the wheel rotational speed generated by the rotation speed information of the drive motor is relatively inaccurate. Therefore, the control module of the brake system can be configured to use the wheel rotational speed generated from the wheel speed sensor information when the deviation between the two wheel rotational speeds mentioned above is greater than the preset value even if the refresh rate of the rotation speed information of the drive motor is higher. Thus, the control module of the brake system always uses the wheel rotational speed generated from the wheel speed sensor information of the wheel, regardless of which of the rotation speed information of the drive motor and the wheel speed sensor information of the wheel is of a higher refresh rate.

Alternatively or additionally, if the refresh rate of the wheel speed sensor information is higher than that of the rotation speed information of the drive motor, and the deviation of the wheel rotational speed generated from the wheel speed sensor information from the that generated from the rotation speed information of the drive motor is smaller than the preset value, it is indicated that the wheel rotational speed generated from the rotation speed information of the drive motor is accurate. In such a case, the control module of the brake system is configured to use the wheel rotational speed generated from the speed information of the drive motor when the refresh rate of the wheel speed sensor information is lower than that of the drive motor speed information.

Preferably, the control module of the brake system is configured such that when the power arrangement of the vehicle is that the drive motor drives a pair of driving wheels through a differential, if the wheel speed sensor information of one of the pair of driving wheels is missing, for example, when the wheel speed sensor is broken or the information transmission is interrupted, the control module speculates the rotational speed of the driving wheel, the wheel speed sensor of which is broken, based on the rotation speed information of the driving motor and the wheel speed sensor information of the other driving wheel.

Alternatively, the control module of the brake system is configured such that when the power arrangement of the vehicle is that the at least one drive motor is at least one pair of drive motors, and in which a pair of driving wheels of the vehicle are driven independently from each other, if the wheel speed sensor information of one of the driving wheels is missing, the control module generates the rotational speed of the driving wheel with the rotation speed information of the respective drive motor.

With the above construction, i.e. even if the wheel speed sensor information of a driving wheel is missing, the control module of the brake system can also obtain the wheel speed of the driving wheel with speculation, so that the functions of the control module of the brake system, such as anti-slip regulation and electronic stability control, can still operate normally, and the influence on them can thus be minimized.

The speculation is implemented in that when the at least one drive motor of the vehicle is at least a pair of drive motors, the control module of the brake system can be configured to generate the rotational speed of the driving wheel based on the speed information of the drive motor and the information of the driving torque transmission mechanism between the drive motor and the driving wheel. Here, the information of the driving torque transmission mechanism is usually pre-determined.

Preferably, the brake system comprises a redundant drive motor control unit. The redundant drive motor control unit enables at least partial control of the controller of the drive motor. With such an arrangement, when the drive motor controller fails, the motor drive can be controlled at least by the redundant drive motor control unit to control the operation and stop of the drive motor. The provision of the redundant drive motor control unit provides safety redundancy for the travelling of the vehicle. For example, the redundant drive motor control unit may not include functions such as energy recovery and hybrid braking to reduce the cost of the control module. However, the present invention is not limited thereto.

It is also preferred that the brake system comprises two control modules, each of which constitutes a braking circuit with at least one pair of electromechanical brakes. Specifically, the brake system of the vehicle comprises two control modules, a front axle control module and a rear axle control module. The front axle control module constitutes a circuit with the electromechanical brakes for the front axle, and the rear axle control module constitutes a circuit with the electromechanical brakes for the rear axle. Alternatively, the front axle control module and the rear axle control module each constitute a circuit with each of the electromechanical brakes for the front axle and the rear axle. Therefore, the brake system comprises a redundant brake circuit, improving the reliability of brake of the vehicle.

In addition, one embodiment of the invention proposes a method for braking a vehicle, a brake system of the vehicle comprising a control module and an electromechanical brake providing braking force to a wheel, wherein the control module receives rotation speed information of at least one drive motor, which provides a driving torque to the vehicle, and wheel speed sensor information of at least one wheel, the method comprising following steps:

a) comparing the refresh rate of the rotation speed information of the drive motor and that of the wheel speed sensor information of the wheel;

b) generating a wheel rotational speed of the wheel from the one of a higher refresh rate from the rotation speed information of the drive motor and the wheel speed sensor information of the wheel.

In the context herein, to generate a wheel rotational speed means that the control module of the brake system of the vehicle obtains the rotational speed of a wheel by calculating the information it receives by means of a program built therein and/or by processing the signal of the received information, for example by processing the wheel speed sensor information.

The braking method mentioned above is applicable to vehicles with various power arrangements, for example, a vehicles in which a drive motor drives wheels through a differential, or a vehicle in which a pair of wheels are driven by at least a pair of drive motors independently of each other. For the latter, two-wheel drive and four-wheel independent drive are contemplated.

The drive motor of the vehicle comprises an internal combustion engine and an electric motor. The drive motor provides a driving torque to the vehicle for running, driving the wheels in motion, and it is controlled by a drive motor controller. In particular, the drive motor controller comprises a motor control unit and a motor drive. The motor control unit and the motor drive can be provided independently from each other, for example, the motor control unit integrated in the control module of the brake system or in the vehicle control unit (VCU). For full electric vehicles or hybrid vehicles using an electric motor as a drive motor, the motor control unit is the motor control unit of the vehicle, and it is the Engine Control Unit (ECU) of the vehicle for an internal combustion engine.

The control module of the brake system can be a control module provided correspondingly to an axle, including an anti-lock braking function (ABS), an electronic stability control function (ESC), an anti-slip regulation function (ASR), and the like.

With the method for braking, the control module of the brake system of the vehicle can obtain a more accurate rotational speed of the wheel, and provide more accurate vehicle state information to the vehicle.

Preferably, the method for braking further comprises the step of validating with the wheel rotational speed generated from the other one from the rotation speed information of the drive motor and the wheel speed sensor information of the wheel. That is to say, when the wheel rotational speed generated from the rotation speed information of the drive motor is used in the previous step, the wheel rotational speed generated from the wheel speed sensor information will be used in this step for validation; or when the wheel rotational speed generated from the wheel speed sensor information is used in the previous step, the wheel rotational speed generated from the rotation speed information of the drive motor will then be used in this step.

The above validation step ensures the accuracy and credibility of the wheel rotational speed used in the brake system.

Preferably, the method for braking further comprises steps of:
  calculating the deviation of the wheel rotational speed generated from the rotation speed information of the drive motor from that generated from the wheel speed sensor information of the wheel;
  always using the wheel rotational speed generated from the wheel speed sensor information of the wheel when the deviation is larger than a preset value.

The preset value is a value that is set in advance and is for example an absolute value. It serves to limit the range of the deviation of the wheel rotational speed generated from the rotation speed information of the drive motor from that generated from the wheel speed sensor information of the wheel. Thus, when the deviation between the two wheel rotational speeds is lower than the preset value, it is indicated that the deviation is in a pre-given and acceptable range. Then, the wheel rotational speed generated from the rotation speed information of the drive motor is further considered as creditable, and thus can be used. In contrary, when the deviation exceeds the preset value, the wheel rotational speed generated from the rotation speed information of the drive motor is thus considered inaccurate. In this case, the method for braking will always use the wheel rotational speed generated from the wheel speed sensor information of the wheel thereafter, regardless of whether the refresh rate of the wheel speed sensor information of the wheel is lower than that of the rotation speed information of the drive motor.

In addition or alternative to the steps above, the method for braking preferably further comprises following step: in the case when the refresh rate of the wheel speed sensor information is higher than that of the rotation speed information of the drive motor, the deviation of the wheel rotational speed generated from the wheel speed sensor information from the wheel rotational speed generated from the rotation speed information of the drive motor is lower than the preset value, using the wheel rotational speed generated from the rotation speed information of the drive motor, when the refresh rate of the wheel speed sensor information is lower than that of the rotation speed information of the drive motor.

Then, when the refresh rate of the wheel speed sensor information is higher than that of the rotation speed information of the drive motor, and the deviation of the wheel rotational speed generated from the rotation speed information of the drive motor from the that generated from the wheel speed sensor information is still lower than the preset value, the wheel rotational speed generated from the rotation speed information of the drive motor can be considered as accurate. On this premise, when the refresh rate of the wheel speed sensor information is lower than that of the rotation speed information of the drive motor, the brake system uses the wheel rotational speed generated from the rotation speed information of the drive motor for example, for controlling whether various vehicle dynamics functions, such as ABS, ASR, ESC and the like, are to be activated.

Further, for vehicle of different power arrangements, the method for braking can further comprise following steps.

For a vehicle in which the at least one drive motor is at least one pair of drive motors and a pair of drive wheels are driven independently of each other, the method for braking comprises following step so as to generate the rotational speed of the drive wheels with the rotation speed information of the drive motor:
  generating the wheel rotational speed of the drive wheels according to the rotation speed information of the drive motors and the information of a driving torque transmission mechanism between the drive motors and the drive wheels.

It should be noted that the above-mentioned information of the driving torque transmission mechanism is usually pre-determined.

For a vehicle in which the drive motor drives a pair of drive wheels through a differential, the method for braking may further comprises following step to speculate the rotational speed of the drive wheels:
  when the wheel speed sensor information of one drive wheel of the pair of drive wheels is missed, speculating the wheel rotational speed of the drive wheel based on the rotation speed information of the drive motor and the wheel speed sensor information of the other drive wheel.

For a vehicle comprising at least one pair of drive motors and a pair of drive wheels driven independently of each other, the method for braking more preferably may further comprises the step of:

using the wheel rotational speed of the drive wheel generated from the rotation speed information of the respective drive motor, when the wheel speed sensor information of one of the drive wheels is missed.

For vehicles of different power arrangements, with the above-mentioned preferred steps of the method for braking, when the wheel speed sensor information of the drive wheel is lost, such as information failure or signal transmission interruption of the wheel speed sensor of the drive wheel, the control module of the brake system can still obtain the rotational speed of the driving wheel for later use.

When the control module of the brake system of the vehicle comprises a redundant drive motor control unit, the method for braking preferably further comprises the steps of:

controlling the drive motor controller by means of the redundant drive motor control unit when the drive motor controller fails.

The redundant drive motor control unit can be integrated into a control module of the brake system of the vehicle. The redundant drive motor control unit enables at least partial control of the drive motor controller. Thus, if the drive motor controller fails, the method for braking controls the drive motor controller by means of the redundant drive motor control unit to achieve the control of the operation and stop of the drive motor. Thus, when the drive motor controller fails, the basic driving safety can still be ensured, that is, the operation and stop of the drive motor can be controlled.

The advantageous technical effects obtained by the invention are that in a vehicle with the brake system according to the present invention, the control module of the brake system can always obtain an accurate wheel rotational speed and providing it for the brake system in that the refresh rate of the rotation speed information of the drive motor and the wheel speed sensor information of the wheel are compared and the wheel rotational speeds generated from them are compared by the control module.

The additional features and advantages described herein will be stated in the following detailed description, and will be obvious to a person skilled in the art or will be appreciated by a person skilled in the art by implementing the implementations described herein.

Advantageous developments of the invention result from the claims, the description and the drawings.

The advantages of features and of combinations of a plurality of features mentioned at the beginning of the description only serve as examples and may be used alternatively or cumulatively without the necessity of embodiments according to the invention having to obtain these advantages.

The following applies with respect to the disclosure—not the scope of protection—of the original application and the patent: Further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims which, however, does not apply to the independent claims of the granted patent.

The number of the features mentioned in the claims and in the description is to be understood to cover this exact number and a greater number than the mentioned number without having to explicitly use the adverb "at least". For example, if an element is mentioned, this is to be understood such that there is exactly one element or there are two elements or more elements. Additional features may be added to these features, or these features may be the only features of the respective product.

The reference signs contained in the claims are not limiting the extent of the matter protected by the claims. Their sole function is to make the claims easier to understand.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Specific Mode for Carrying Out the Invention

Figure 1:
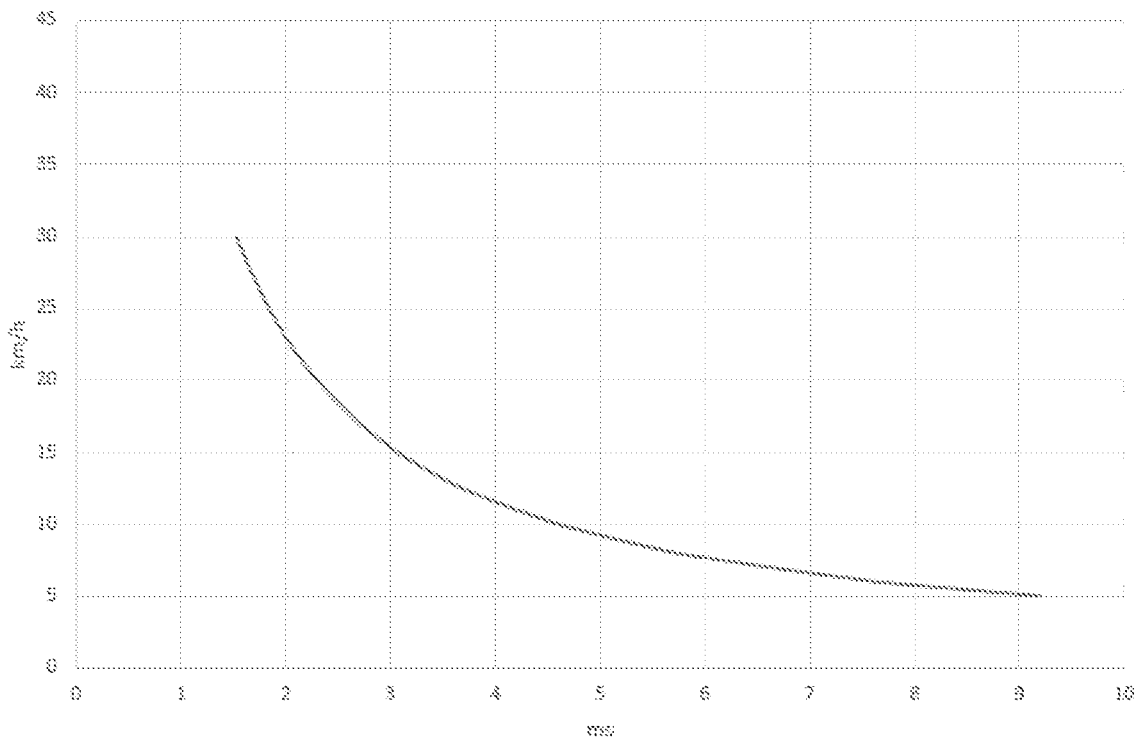
FIG. 1 is a diagram schematically showing a relationship between the refresh time of the wheel speed sensor information of a wheel speed sensor in the prior art and the vehicle speed.

As described in the beginning of the present application, FIG. 1 shows a relationship between a refresh time of the wheel speed sensor information of a wheel speed sensor of a wheel of a vehicle in the prior art and the vehicle speed. Refresh rate is the inverse of the refresh time and long refresh time equals low refresh rate.

Figure 2:
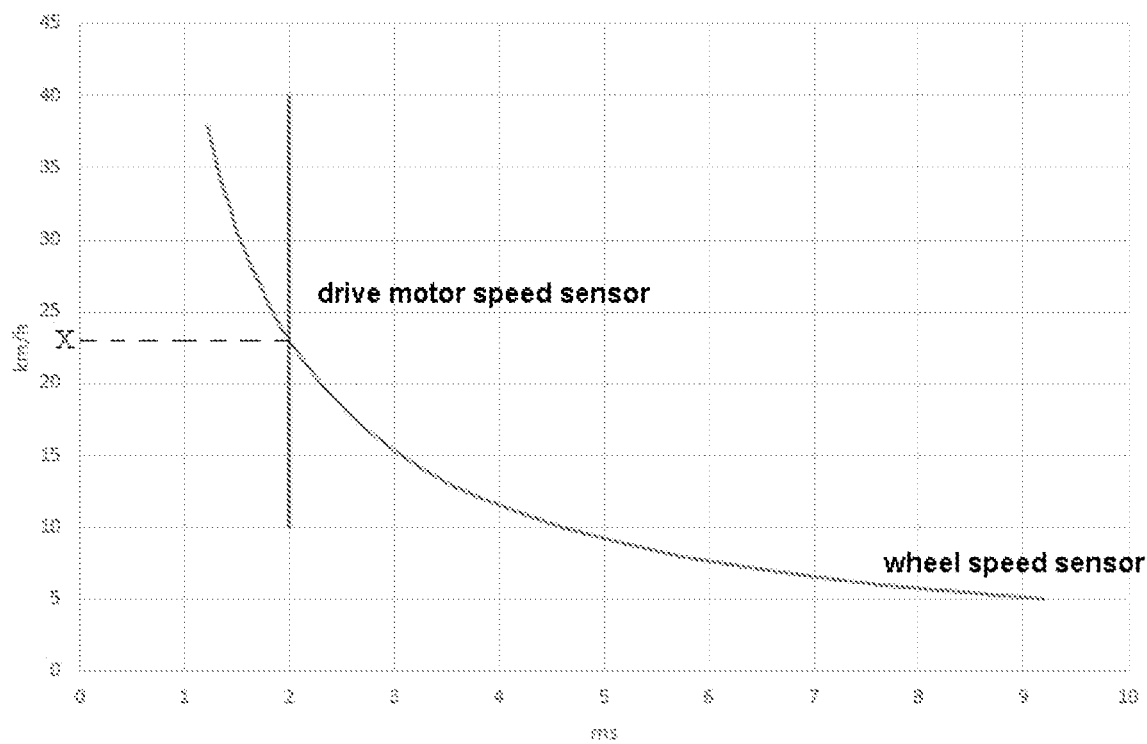
FIG. 2 exemplarily shows a relationship between the refresh time of the wheel speed sensor information of the wheel speed sensor of FIG. 1 and the refresh time of the rotation speed information of a drive motor of the drive motor speed sensor and the vehicle speed.

Reference is now made to FIG. 2. FIG. 2 further shows the relationship between the refresh time of the rotation speed information of the drive motor sensed by the drive motor speed sensor and the refresh time of the wheel speed sensor information sensed by the wheel speed sensor of the wheel exemplarily shown in FIG. 1 and the relationship between them and the vehicle speed. Refresh rate is the inverse of the refresh time and long refresh time equals low refresh rate. Known from FIG. 2, the refresh rate of the rotation speed information of the drive motor sensed by the drive motor speed sensor is independent of the vehicle speed, unlike the characteristic that the refresh rate of the wheel speed sensor information of the wheel speed sensor lowers as the vehicle speed decreases. Therefore, when the vehicle speed reaches X indicated in the figure, the refresh rate of the rotation speed information sensed by the drive motor speed sensor is the same as the refresh rate of the wheel speed sensor information sensed by the wheel speed sensor of the wheel. Thereafter, as the vehicle speed further decreases, the refresh rate of the rotation speed information of the drive motor sensed by the drive motor speed sensor will be higher than the refresh rate of the wheel speed sensor information sensed by the wheel speed sensor of the wheel. Then, principally, it may be considered that when the vehicle speed is higher than X, the wheel rotational speed generated from the rotation speed information of the drive motor provided by the drive motor speed sensor will reflect the dynamic information of the wheel more realistically than the wheel rotational speed generated from the wheel speed sensor information, and therefore the wheel rotational speed thus obtained can also be considered to be more accurate. It should be noted that the wheel rotational speed of the wheel referred to herein is expressed in radians/second (rad/s).

The inventors of the present application thus propose a brake system as exemplarily shown in FIGS. 3A to 4C.

The brake system will be described by way of example with reference to FIG. 3A below. The brake system comprises two control modules 20A, 20B and electromechanical brakes 311, 321, 331, 341 providing braking force to the wheels 31, 32, 33, 34, wherein the control modules 20A, 20B are respectively arranged in correspondence to the two axles of the vehicle, and they control and/or supply power to the electromechanical brakes 311, 321, 331, 341 provided at the two ends of the respective axles. The control modules 20A, 20B may be installed on the vehicle as individually packaged devices. However, it is conceivable for a person skilled in the art that the internal elements of the control modules could also be installed at different locations of the vehicle in a non-independent packaging manner, and the packaging manner and installation locations can be adjusted according to the actual layout of the vehicle as long as the control of and/or the power supply to the electromechanical brakes can be achieved. At least one control module 20A, 20B include, for example, an anti-lock braking module (ABS), an electronic stability control module (ESC), an anti-slip regulation function (ASR), and the like.

The control module 20A, 20B requires relatively accurate rotational speed of the wheels for determination so as to perform the above-described functions. For example, during braking, the control module 20A, 20B needs to monitor the rotational speed of the wheels in real time to determine whether the wheel has a tendency to lock, and accordingly keeps the brake applied by the electromechanical brake of the corresponding wheel from increasing or reduces the brake that has already been applied.

The electromechanical brakes 311, 321, 331 and 341 provided at the wheel ends of the vehicle for provide a braking force to each of the wheels comprise a brake motor for generating a braking force, and a mechanical transmission mechanism driven by the brake motor. In the case of a disc brake, the brake motor converts electrical power into mechanical energy so as to drive the mechanical transmission mechanism to push a brake pad towards or away from a brake disc to generate a desired braking force.

In the vehicle shown in FIGS. 3A to 4C, the control module 20B of the front axle forms a circuit with the electromechanical brakes 311, 321 of the two wheels 31, 32 of the front axle, and the control module 20A of the rear axle forms a circuit with the electromechanical brakes 331, 341 of the two wheels 33, 34 of the rear axle.

Alternatively, not shown in the figures, the front axle control module 20B can constitute a circuit with the electromechanical brakes 311, 321, 331, 341 of the wheels 31-34 of the front and rear axles, and the rear axle control module 20A can also constitute a circuit with the electromechanical brakes 311, 321, 331, 341 of the wheels 31-34 of the front and rear axles. Thus, a fully redundant circuit is created, and when one of the control modules 20A, 20B fails to control the electromechanical brakes due to a failure, the control module in the other circuit can instead control the corresponding electromechanical brakes as needed to apply brake, thereby providing safety redundancy for the vehicle.

The vehicle has a drive motor 10, which may be an electric motor or an internal combustion engine, and the drive motor 10 is controlled by a drive motor controller 11.

In the context of the present invention, unless otherwise specified, the drive motor 10 can be either an electric motor or an internal combustion engine, and the drive motor controller 11 is a controller of the electric motor or an Engine Control Unit (ECU) of the internal combustion engine. Taken an electric motor as an example, the drive motor controller 11 also includes a motor drive 13 (see FIGS. 4A to 4C) and a motor control unit. The motor drive 13 and the motor control unit can be provided separately. The motor drive 13 is for example mainly composed of a three-phase bridge circuit, and is used to drive the drive motor 10 according to a low current control signal from the motor control unit. The motor control unit completes the logic and digital control of the drive motor 10, and a logic circuit is constructed therein, and can control it through an interface of a higher level. For example, the motor control unit can receive a control signal from the control module 20A, 20B of the brake system or from the Vehicle Control Unit (VCU), or can be integrated in the control module 20A, 20B of the brake system or in the Vehicle Control Unit (VCU). In addition, it can be noted in FIGS. 3A to 4C that the control module 20A and the control module 20B are communicated with each other, such that when one of them, for example, the control module 20A fails, the control module 20B can perform a control of the drive motor controller 11 instead.

The shown vehicle further includes:

- wheel speed sensors 312, 322, 332, 342 provided correspondingly with each of the wheels 31, 32, 33, 34 of the vehicle for monitoring the wheel speed, wherein the wheel speed sensor information sensed by the wheel speed sensors are send to at least one of the control modules 20A, 20B;
- a motor speed sensor 12 for detecting the rotation speed of the drive motor 10, wherein the rotation speed information of the drive motor sensed by the motor speed sensor 12 is also sent to at least one of the control modules 20A, 20B;
- an accelerator pedal 30 through which the driver's intention to accelerate is input and transmitted to the drive motor controller 11;
- a brake pedal 40 coupled respectively to the control modules 20A and 20B to receive the driver's braking operation and transmit it to the control modules 20A and 20B;
- a differential 50, which allows wheels 33, 34 to rotate at different speed;
- a charging power supply 60 electrically connected to the control modules 20A and 20B; and
- when the drive motor 10 is an electric motor, the vehicle further comprises a power battery 70 and a battery management system 71, for supplying power to the motor.

With a system architecture shown in the embodiments of the present invention, the control module 20A and/or 20B can obtain external information including the state of the drive motor 10, the wheel speed sensors 312, 322, 332, 342, the accelerator pedal 30, and the unmanned driving system 101, so as to determine the driving state of the vehicle more accurately, such that a correction can be made when a driving torque error occurs, so as to timely activate the vehicle dynamics control function or auxiliary driving function, such as anti-slip regulation, electronic stability control, emergency brake and the like.

Figure 3A:
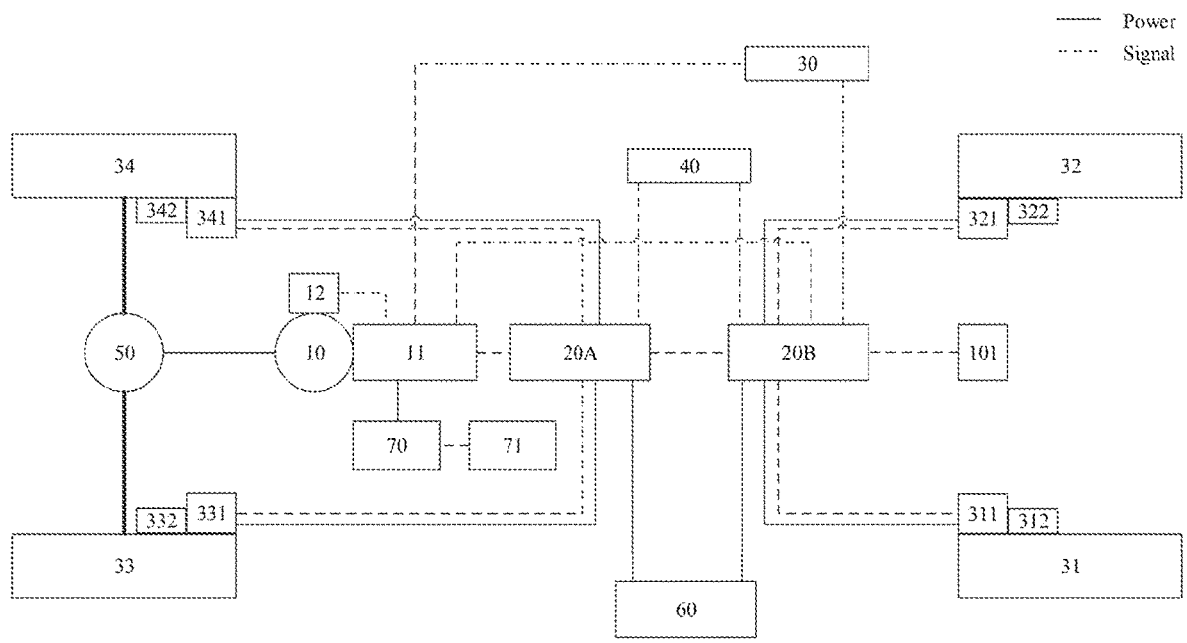
FIG. 3A schematically illustrates a power arrangement of a vehicle with a brake system according to the present invention.

In the embodiment shown in FIG. 3A, the drive motor 10 of the shown vehicle drives the wheels 33 and 34 through a differential 50.

In the embodiment shown, the electrical energy consumed by the brake system is derived from a recharging power source 60, which may be independent of the power source of the vehicle (e.g., the power battery 70 used to drive the drive motor of the vehicle and/or the generator or hub generator of the vehicle), and the recharging power source 60 is charged from the power source of the vehicle by voltage conversion or other means known to a person skilled in the art. However, according to an embodiment, the recharging power source 60 may also be a power battery 70 onboard the vehicle for powering the drive system of the vehicle or a storage battery for powering electrical appliances on board the vehicle, in which way the number of power supplies required in the vehicle can be reduced. The recharging power source 60 is electrically coupled to the control modules 20A and 20B to supply power to the control modules 20A and 20B, and to supply power to the brake motors of the electromechanical brake 311, 321, 331, 341 provided at the wheel ends through the control modules 20A and 20B to generate a braking force. In one embodiment, the control modules 20A, 20B can each comprise a power supply unit charged by the recharging power source 60, and the output voltage and current thereof can be higher than the recharging power source 60 to adapt to the recharging power source 60 and to the high-power brake motors of the electromechanical brakes 311, 321, 331, 341 that cannot be driven by the recharging power source 60 and its associated circuits, so as to provide sufficient braking force to adapt to large commercial vehicles. In one embodiment, the power supply unit may use any type of capacitor-based power supplies, wherein at least one of the capacitor-based power supplies is a supercapacitor or a supercapacitor bank consisting of a plurality of supercapacitor units; the recharging power source 60 charges the power supply unit with a low voltage, for example, the same 12 V/24 V voltage as the vehicle circuit, and the power supply unit supplies the brake motors of the electromechanical brakes 311, 321, 331, 341 with a high voltage, for example, 48 V or higher, thereby constituting a more reliable, stable and redundant power supply architecture.

A person skilled in the art will understand that, in addition to a centralized arrangement as shown in FIG. 3A, wherein each electromechanical brake 311, 321, 331, 341 is supplied with power from a single recharging power battery 60 through two control modules 20A and 20B, it is also possible that two recharging power sources are provided in a one-to-one correspondence with the control modules 20A and 20B, and power is supplied to corresponding power supply units in the control modules 20A and 20B with the two recharging power sources, respectively.

In other embodiments, a person skilled in the art may also derive the energy required to drive the brake motor in other means.

In the shown power arrangement, the control module 20A is configured such that when the wheel speed sensor, for example 342, of one of the two drive wheels 33, 34 is broken, the control module 20A speculates the rotational speed of the drive wheel 34 based on the rotation speed information of the drive motor 10 sensed by the motor speed sensor 12 of the drive motor 10 and the wheel speed sensor information sensed by the wheel speed sensor 332 of the other drive wheel 33.

It should be noted that the brake system shown in FIG. 3A optionally further comprises an unmanned driving system 101 in communication with control module 20B and/or control module 20A. The unmanned driving system 101 can be any of the auxiliary driving systems and/or autonomous driving systems of the various unmanned driving systems known in the art that improve driving safety, which may create a request for an adjustment in the driving torque or braking torque during operation due to unmanned operation.

Figure 3B:
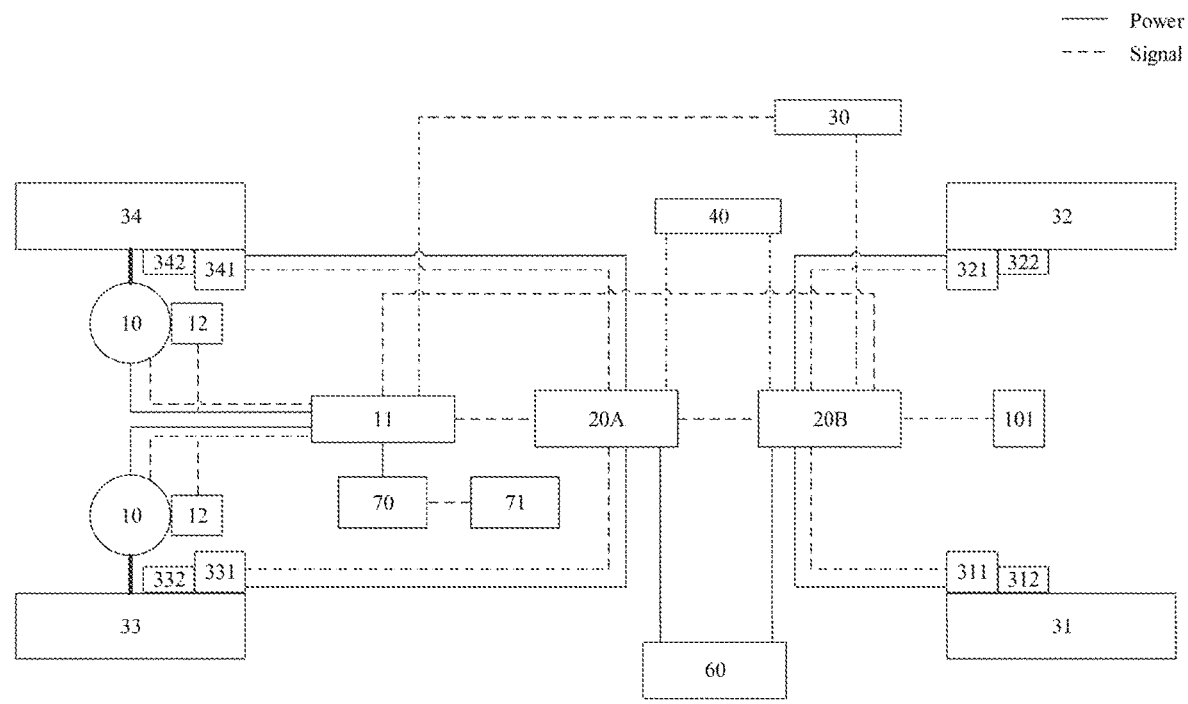
FIG. 3B schematically illustrates another power arrangement of a vehicle with a brake system according to the present invention.

Now turning to FIG. 3B, FIG. 3B schematically shows another power arrangement of a vehicle with a brake system according to the present invention. It differs from the power arrangement shown in FIG. 3A in that the wheels 33 and 34 of the vehicle are each provided with a drive motor 10, each drive motor 10 in turn being provided with a separate motor speed sensor 12, and both drive motors 10 and motor speed sensors 12 are exemplarily coupled to the drive motor controller 11. In this power arrangement, the rear wheels 33, 34 are driven independently of each other. During running of the vehicle, the rotation speed information of the drive motor 10 sensed by the motor speed sensor 12 of each drive motor 10 and the wheel speed sensor information sensed by the wheel speed sensors 312, 322, 332, 342 are transmitted to the control module 20A.

Figure 3C:
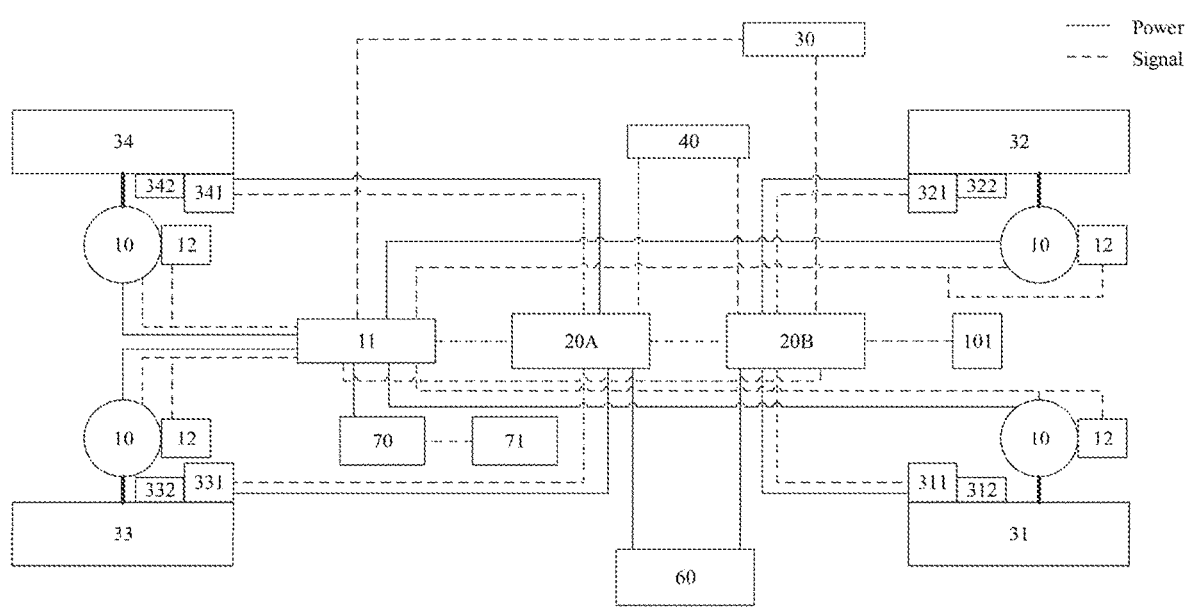
FIG. 3C schematically illustrates yet another power arrangement of a vehicle with a brake system according to the present invention.

FIG. 3C shows yet another power arrangement of a vehicle having a brake system according to the present invention. Being different from the power arrangements shown in FIGS. 3A and 3B described above, the wheels 31, 32, 33, 34 of the vehicle are respectively provided with one drive motor 10, and each drive motor 10 is provided with a separate motor speed sensor 12. The four drive motors 10 and motor speed sensors 12 are all exemplarily connected with the same drive motor controller 11. As a result, all four wheels 31, 32, 33, 34 of the vehicle are driven independently of each other. During running of the vehicle, the rotation speed information of the drive motor 10 sensed by the motor speed sensor 12 of each of the four drive motors 10 and the wheel speed sensor information sensed by the wheel speed sensors 312, 322, 332, 342 are respectively transmitted to the control modules 20A and 20B.

In a vehicle with the power arrangement shown in FIG. 3B or 3C, the control module 20A and/or 20B of the brake system is configured to generate the wheel rotational speed of the drive wheels according to the rotation speed information of the drive motors 10 sensed by the motor speed sensors 12 and the information of a driving torque transmission mechanism between the drive motors 10 and the drive wheels. The driving torque transmission mechanism is not shown here, and the information of the driving torque transmission mechanism is predetermined and it can be obtained by the control modules 20A, 20B or is input therein in advance.

Further, in the vehicle with the power arrangement shown in FIG. 3B or 3C, when for example the sensor information of the wheel speed sensor 332 of the drive wheel, for example, the rear wheel 33 is missing, such as due to a failure of the wheel speed sensor 332 or a transmission line interruption, the rotational speed of the rear wheel 33 can be obtained in that the control module 20A generates the rotational speed of the rear wheel 33 with the rotation speed information of the drive motor 10 sensed by the motor speed sensor 12 of the drive motor 10 that is corresponding to the rear wheel 33. The same applies to the case where the wheel speed sensor information of the front wheels 31, 32 shown in FIG. 3C is missing.

Therefore, the brake system according to the present invention is applicable to vehicles with various power arrangements including: the power system with a single drive motor; a power arrangement with a pair of drive motors the corresponding wheels of which are driven independently of each other; and a power arrangement in which the drive motor and the wheel are provided in a one-to-one relationship, each wheel being driven independently.

Figure 4A:
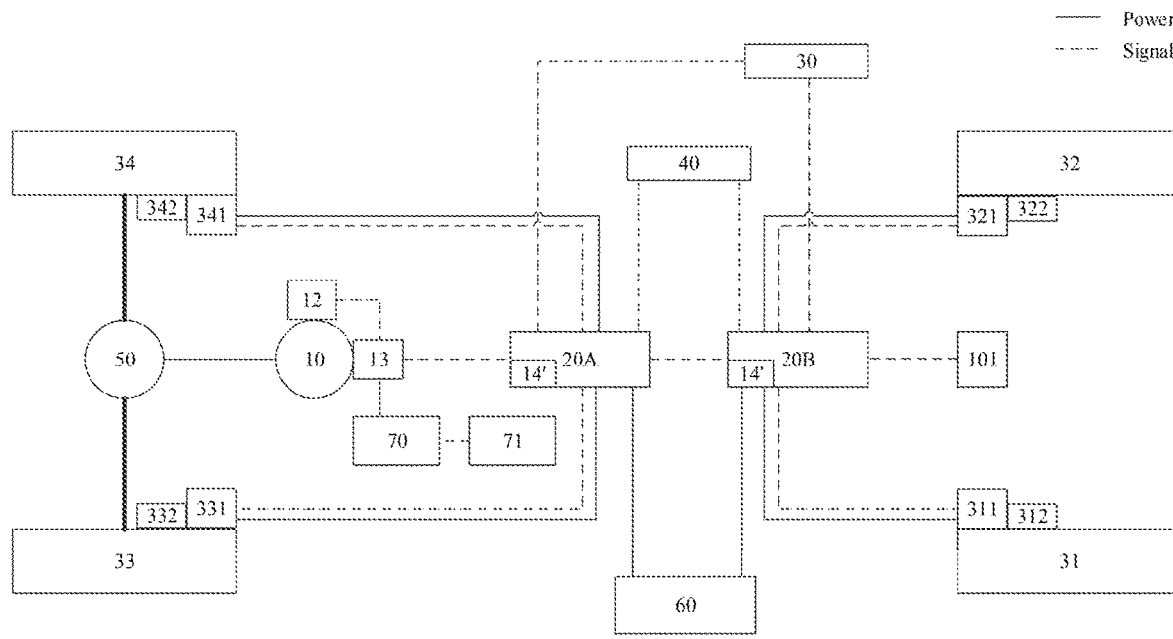
FIG. 4A schematically illustrates a power arrangement of a vehicle with a brake system according to the present invention.
Figure 4B:
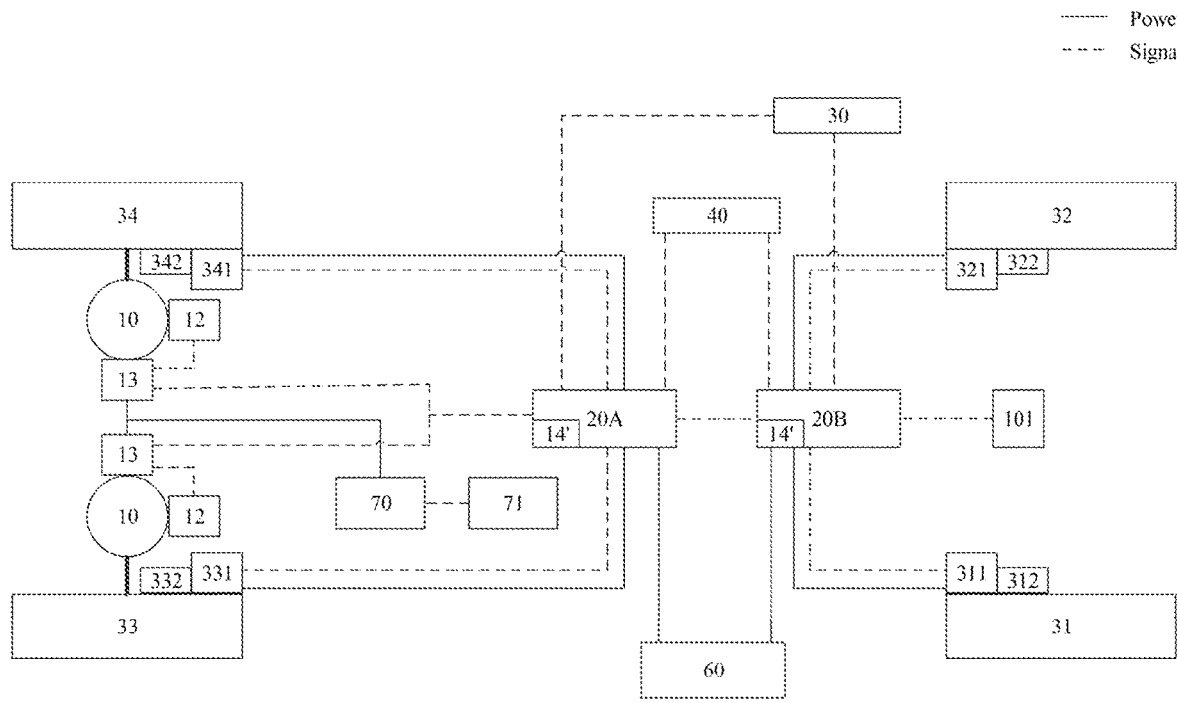
FIG. 4B schematically illustrates another power arrangement of a vehicle with a brake system according to the present invention.
Figure 4C:
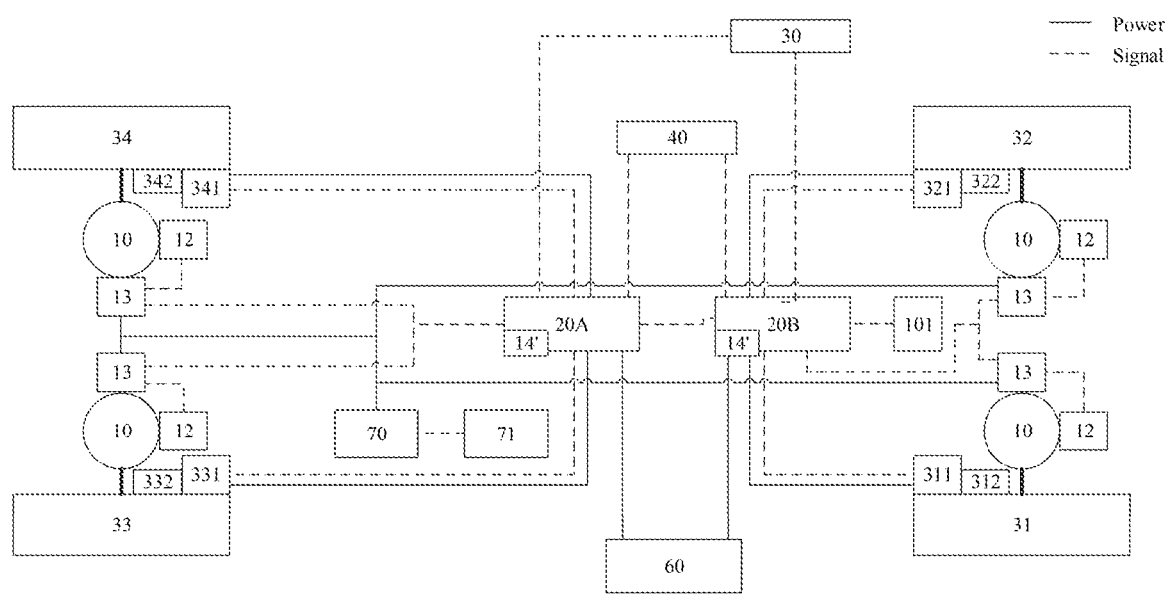
FIG. 4C schematically illustrates yet another power arrangement of a vehicle with a brake system according to the present invention.

As shown in FIGS. 4A to 4C, a redundant motor control unit 14' can also be integrated in the control modules 20A, 20B of the brake system. Thus, when the drive motor controller 11 fails, the control modules 20A, 20B of the brake system can control the motor drive 13 through this redundant motor control unit 14' to control the operation and stop, i.e. the activation and the deactivation of the drive motor 10. However, in this embodiment, the redundant motor control units 14' integrated in the control modules 20A, 20B may not support functions such as energy recovery, hybrid braking and the like, in order to reduce the cost of the control modules 20A, 20B. Alternatively, in another embodiment of the invention, the redundant motor control unit 14' integrated in the control modules 20A, 20B may also support the additional functions described above.

Figure 5:
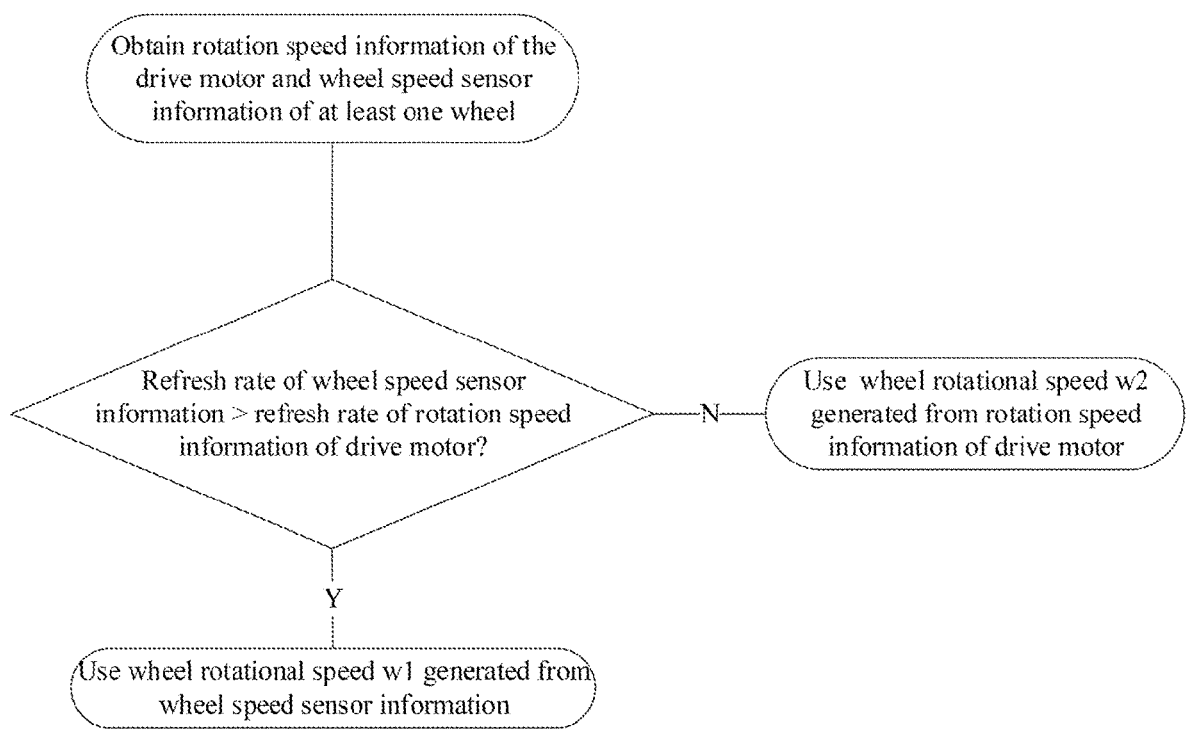
FIG. 5 shows a flow chart of a process in which a brake system according to the present invention obtains the wheel rotational speed.

The process in which the control module 20A, 20B of the brake system of the invention obtains the wheel rotational speed of a wheel is now to be explained in detail with reference to FIGS. 5 to 7.

The basic process shown in FIG. 5 will be explained by taking the power arrangement shown in FIG. 3A as an example. The control module 20A obtains the rotation speed information of the drive motor 10 sensed by the motor speed sensor 12 of the drive motor 10 and the wheel speed sensor information provided by for example the wheel speed sensors 332 of at least one wheel, such as the wheel 33. Then, the control module 20A compares the refresh rate of the rotation speed information of the drive motor 10 and that of the wheel speed sensor information of the wheel speed sensors 332, 342. If the refresh rate of the wheel speed sensor information is higher than the that of the rotation speed information of the drive motor 10 with the comparison of the control module, the control module 20A generates the rotational speed w1-33 of the wheel 33 by calculation and/or signal processing of the wheel speed sensor information, the rotational speed is later sued for performing the functions of the anti-lock brake function, electronic stability control function, anti-slip regulation function and the like. Otherwise, the control module 20A uses the rotational speed w2-33 of the wheels 33, which is generated by calculating and/or signal processing the rotation speed of the drive motor 10, for the vehicle dynamics functions described above.

The above-described process is also applicable to a vehicle having the power arrangement shown in FIG. 3B or 3C, and it should be noted that the refresh rate of the wheel speed sensor information must be compared with the refresh rate of the rotation speed information of the corresponding drive motor 10.

In the discussion below, the two preferable processes described are also applicable to a vehicle having the power arrangement shown in FIG. 3B or 3C, unless otherwise noted.

In addition, since the control module 20A and the control module 20B communicate with each other in the illustrated system architecture, the particular determination can also be done by the control module 20B, or the wheel speed sensor information sensed by the wheel speed sensors 312, 322 of the two wheels 31, 32 of the front axle may be sent to the control module 20B corresponding to the front axle.

Based on the process discussed above, the control module 20A can also validate the wheel rotational speed used above with the wheel rotational speed w of the wheel 33 generated from the information of the lower refresh rate. When, for example, the refresh rate of the wheel speed sensor information sensed by the wheel speed sensor 332 of the wheel 33 is higher than the refresh rate of the rotation speed information of the drive motor 10 sensed by the motor speed sensor 12 of the drive motor 10, the control module 20A uses the rotational speed w1-33 of the wheel generated from the wheel speed sensor information for the subsequent operation of vehicle dynamics functions such as ABS, ESC, ASR and the like, and validates the aforementioned rotational speed w1-33 of the wheel with the wheel rotational speed w2-33 generated from the rotation speed information of the drive motor 10 or vice versa. If the result of the validation is correct, for example, the two rotational speeds w1-33 and w2-33 of the wheel 33 do not differ from each other greatly or they are the same, the rotational speed of the wheel used by the control module 20A is considered credible. Otherwise, there may be sensor failure and the like, thus requiring further inspection of the respective sensor, for example.

Besides, other vehicle information can be used to verify or validate the wheel speed sensor information and motor speed sensor, thereby to further improve the accuracy and credibility. For example, the calculated reference speed of the vehicle based on the inertia (acceleration) sensor information, GPS information, etc.

Further, the control modules 20A, 20B of the brake system may also have two preferable processed explained in detail below.

Figure 6:
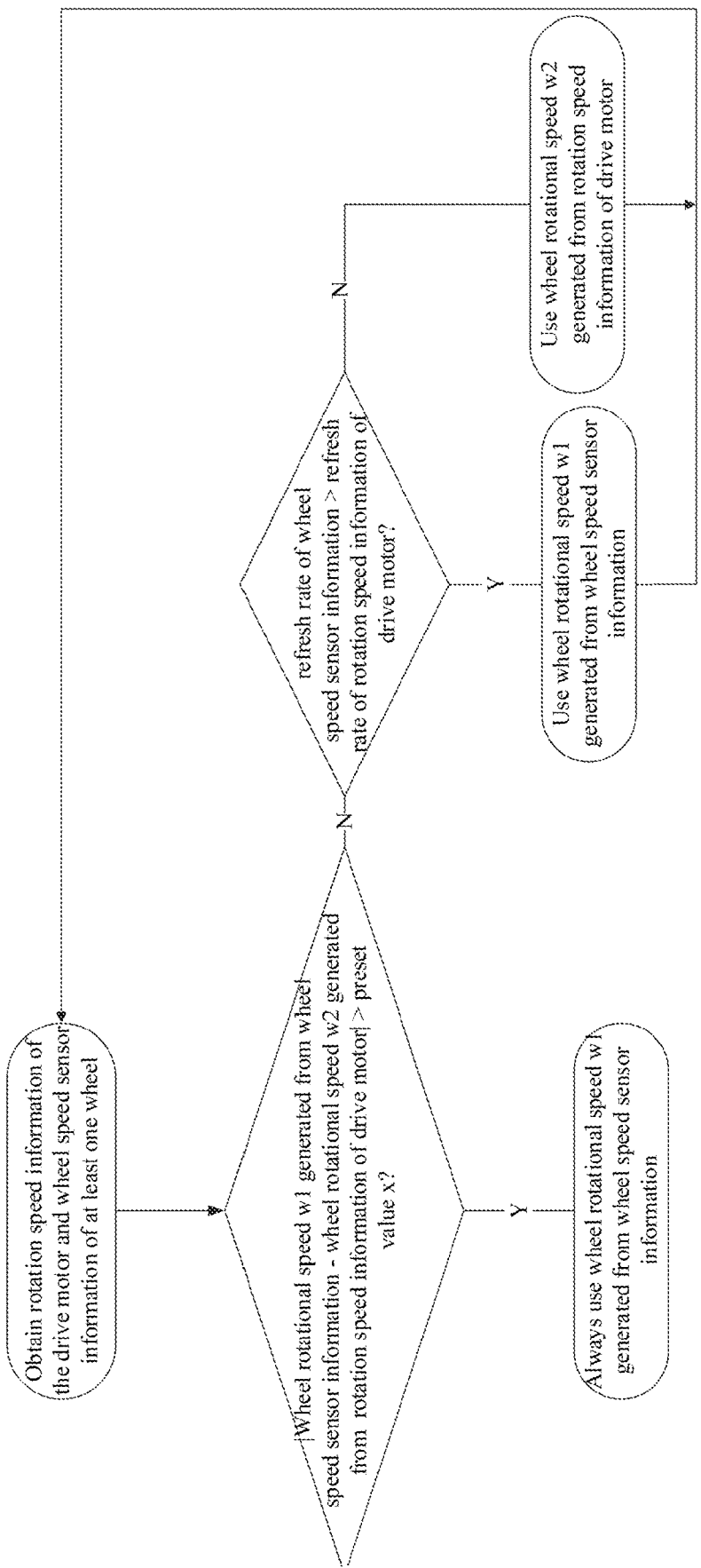
FIG. 6 shows a flow chart of another preferable process in which a brake system according to the present invention obtains the wheel rotational speed.

FIG. 6 shows a preferable process. Still taking the arrangement shown in FIG. 3A as an example, the control module 20A obtains the rotation speed of the drive motor 10 sensed by the motor speed sensor 12 of the drive motor 10 and the wheel speed sensor information sensed by the wheel speed sensor 332 of at least one wheel, for example, the wheel 33, and compares the wheel rotational speeds w1-33 and w2-33 generated from those two kinds of information, finds the absolute value of the difference between them, and compares this difference with a preset value x set in advance. x is here a fixed value which is set in advance. In particular, the preset value may also be an absolute value expressed in radians/second. If the difference between the two is larger than x, the wheel rotational speed w2-33 of the wheel 33 generated from the rotation speed information of the drive motor cannot be considered as reliable as the wheel rotational speed w1-33 of the wheel 33 generated from the wheel speed sensor information of the wheel 33. In this case, the control module 20B will always use the rotational speed w2-33 of the wheel 33 generated from the wheel speed sensor information of the wheel speed sensor 332 regardless of whether the refresh rate of the wheel speed sensor information is higher than that of the rotation speed information of the drive motor 10. Otherwise, if the absolute value of the difference between w1-33 and w2-33 is smaller than the preset value x, the control module 20B further compares the refresh rate of the two kinds of information, if the refresh rate of the wheel speed sensor information is higher, the control module 20B will use the rotational speed w1-33 of the wheel 33 generated from the wheel speed sensor information, otherwise the control module 20B will use the rotational speed w2-33 of the wheel 33 generated from the rotation speed information of the drive motor 10. It should be noted that for the latter case, i.e., the case in which the difference between the two rotational speeds of the wheel is less than the preset value, and thus the rotational speed of the wheel generated from the rotation speeds of the drive motor is used, the control module 20B will repeat the above-described process.

Figure 7:
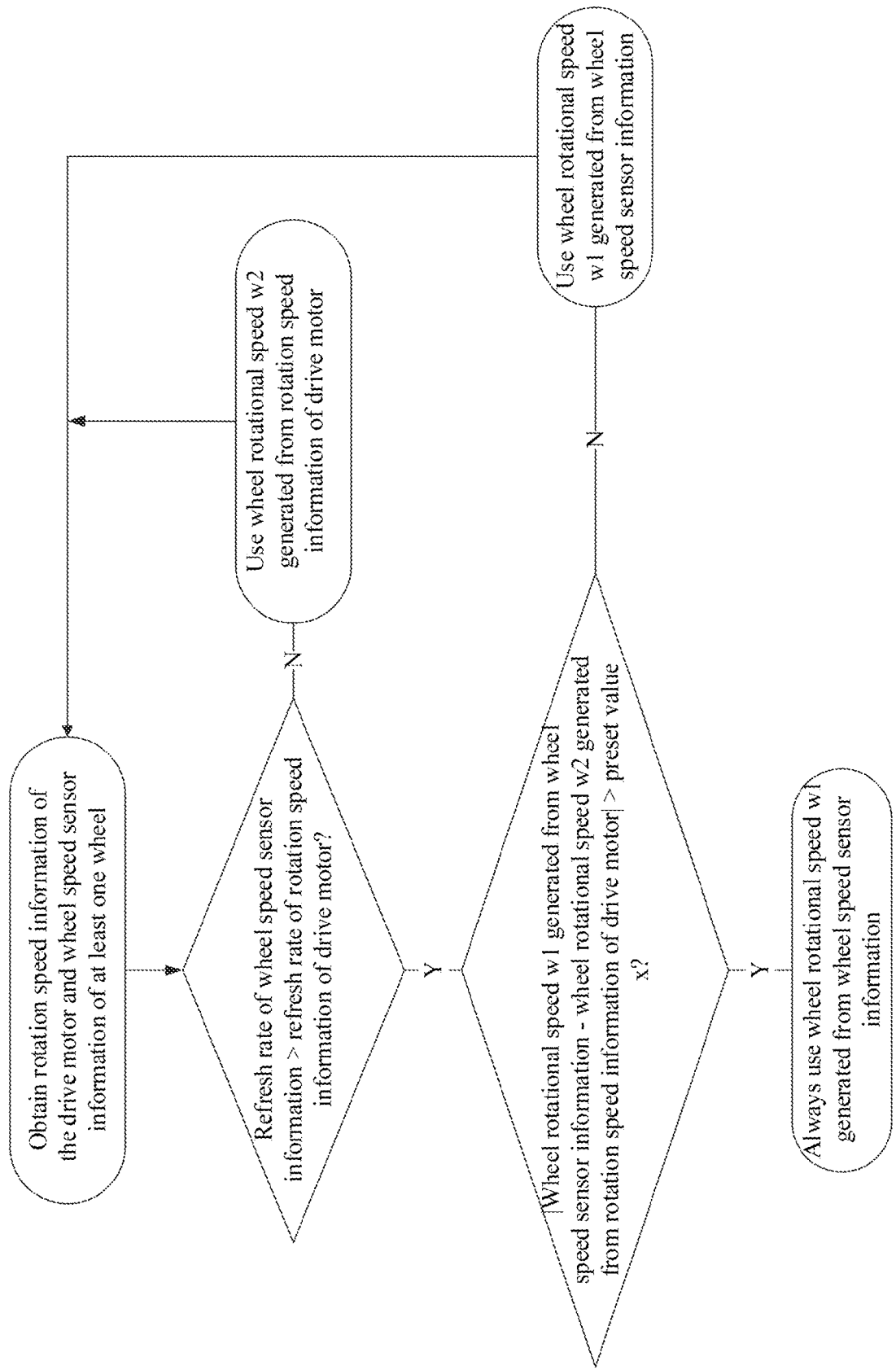
FIG. 7 shows a flow chart of yet another preferable process in which a brake system according to the present invention obtain the wheel rotational speed.

FIG. 7 shows another preferable process. Here, the power arrangement shown in FIG. 3A will still be described by way of example. The control module 20A is also constructed to obtain the rotation speed information of the drive motor 10 sensed by the motor speed sensor 12 of the drive motor 10 and the wheel speed sensor information provided by for example the wheel speed sensor 332 of at least one wheel, such as the wheel 33. The control module 20A then compares the refresh rates of the two types of information. If the refresh rate of the rotational speed information of the drive motor is higher, then the rotational speed of the wheel 33 generated by the rotation speed information of the drive motor is considered to be more accurate. Therefore, the control module 20A uses the wheel rotational speed of the wheel 33 generated from the rotation speed information of the drive motor 10. Otherwise, the control module 20A further determines whether the absolute value of the difference between the wheel rotational speed w1-33 of the wheel generated from the wheel speed sensor information and the wheel rotational speed w2-33 of the wheel generated from the rotation speed information of the drive motor is greater than a preset value x. x is here a fixed value which is set in advance. In particular, the preset value may also be an absolute value expressed in radians/second. When the absolute value of the difference between the wheel rotational speed w1-33 and w2-33 is greater than the preset value x, it is considered that the deviation of w2-33 from w1-33 is too great, and the wheel rotational speed w2-33 of the wheel 33 generated from the rotation speed information of the drive motor 10 is not credible. Then the control module 20A will always use the wheel rotational speed w1-33 generated from the wheel speed sensor information regardless of which of the refresh rate of both the wheel speed sensor information and the rotation speed information of the drive motor 10 is higher.

In contrast, when the absolute value of the difference between the wheel rotational speed w1-33 and w2-33 is less than the preset value x, it is considered that the wheel rotational speed w2-33 of the wheel 33 generated from the rotation speed information of the drive motor 10 is still credible. At this time, since it is previously determined that the refresh rate of the wheel speed sensor information is higher than that of the rotation speed information of the drive motor, the wheel rotational speed w1-33 generated from the wheel speed sensor information will still be used in this determination, but the control module 20A will still repeat the above determination process in the subsequent process of monitoring the wheel rotational speed of the wheel. In other words, since it can be determined that the wheel rotational speed w2 of the wheel generated from the rotation speed information of the drive motor is credible, when the refresh rate of the rotation speed information of the drive motor is higher than the refresh rate of the wheel speed sensor information, the wheel rotational speed w2 of the wheel generated from the rotation speed information n of the drive motor is used, and the above process is continuously repeated, that is to say, the rotation speed information of the drive motor and the wheel speed sensor information of at least one wheel are obtained and the refresh rates of both are compared.

The previous description of the disclosure is provided to enable any person skilled in the art to make or use the disclosure. Various modifications to the disclosure will be apparent to a person skilled in the art, and the generic principles defined herein may be applied to other variations without departing from the spirit or scope of the disclosure. Thus, the disclosure is not intended to be limited to the examples and designs described herein, but should be accorded to the widest scope consistent with the principles and novel features disclosed herein.

Many variations and modifications may be made to the preferred embodiments of the invention without departing substantially from the spirit and principles of the invention. All such modifications and variations are intended to be included herein within the scope of the present invention, as defined by the following claims.

We claim:

1. A brake system for a vehicle, comprising:
   a control module and an electromechanical brake providing braking force to a wheel, wherein the control module
   receives rotation speed information of at least one drive motor, which provides a driving torque to the vehicle, and wheel speed sensor information of at least one wheel;
   compares a refresh rate of the rotation speed information of the drive motor and a refresh rate of the wheel speed sensor information of the wheel; and
   generates a wheel rotational speed by use of the information of a higher refresh rate.

2. The brake system according to claim 1, wherein the control module is configured such that, when the wheel rotational speed generated from the rotation speed information of the drive motor or that generated from the wheel speed sensor information of the wheel is used, the control module will use the wheel rotational speed generated from the other of the drive motor or the wheel for validation.

3. The brake system according to claim 2, wherein the wheel rotational speed generated from the wheel speed sensor information will always be used when a deviation of the wheel rotational speed generated from the rotation speed information of the drive motor from that generated from the wheel speed sensor information of the wheel is larger than a preset value.

4. The brake system according to claim 2, wherein the control module is configured such that in a case when the refresh rate of the wheel speed sensor information is higher than that of the rotation speed information of the drive motor, a deviation of the wheel rotational speed generated from the wheel speed sensor information from the wheel rotational speed generated from the rotation speed information of the drive motor is smaller than a preset value, when the refresh rate of the wheel speed sensor information is lower than that of the rotation speed information of the drive motor, it will use the wheel rotational speed generated from the rotation speed information of the drive motor.

5. The brake system according to claim 3, wherein the control module is configured such that in the case when the refresh rate of the wheel speed sensor information is higher than that of the rotation speed information of the drive motor, the deviation of the wheel rotational speed generated from the wheel speed sensor information from the wheel rotational speed generated from the rotation speed information of the drive motor is smaller than a preset value, when the refresh rate of the wheel speed sensor information is lower than that of the rotation speed information of the drive motor, it will use the wheel rotational speed generated from the rotation speed information of the drive motor.

6. The brake system according to claim 2, wherein the drive motor drives a pair of drive wheels through a differential, and the control module is configured such that when the wheel speed sensor information of one drive wheel of the pair of drive wheels is missed, the rotational speed of the drive wheel will be speculated based on the rotation speed information of the drive motor and the wheel speed sensor information of the other drive wheel.

7. The brake system according to claim 2, wherein the at least one drive motor is at least one pair of drive motors, and wherein a pair of drive wheels of the vehicle are driven independently from each other.

8. The brake system according to claim 7, wherein the control module is configured to generate the rotational speed of the drive wheels according to the rotation speed information of the drive motors and the information of a driving torque transmission mechanism between the drive motors and the drive wheels.

9. The brake system according to claim 7, wherein the control module is configured such that when the wheel speed sensor information of one drive wheel is missed, it will use the rotational speed of the drive wheel generated from the rotation speed information of the respective drive motor.

10. The brake system according to claim 2, wherein the control module comprises a redundant drive motor control unit which can at least partly achieve the control of the motor drive.

11. The brake system according to claim 2, wherein the brake system comprises two control modules, each of which constitutes a brake circuit with at least one pair of electromechanical brakes.

12. A method for braking a vehicle, a brake system of the vehicle comprises a control module and an electromechanical brake providing braking force to a wheel, wherein the control module receives rotation speed information of at least one drive motor, which provides a driving torque to the vehicle, and wheel speed sensor information of at least one wheel, the method comprising:
comparing a refresh rate of the rotation speed information of the drive motor and a refresh rate of the wheel speed sensor information of the wheel; and
generating a rotational speed of the wheel from the one of a higher refresh rate from the rotation speed information of the drive motor and the wheel speed sensor information of the wheel.

13. The method for braking a vehicle according to claim 12, the method further comprising:
validating with a wheel rotational speed of the wheel generated from the rotation speed information of the drive motor and the wheel speed sensor information of the wheel.

14. The method for braking a vehicle according to claim 13, the method further comprising:
calculating a deviation of the wheel rotational speed generated from the rotation speed information of the drive motor from that generated from the wheel speed sensor information of the wheel;
always using the wheel rotational speed generated from the wheel speed sensor information of the wheel when the deviation is larger than a preset value.

15. The method for braking a vehicle according to claim 13, the method further comprising:
in a case when the refresh rate of the wheel speed sensor information is higher than that of the rotation speed information of the drive motor, the deviation of the wheel rotational speed generated from the wheel speed sensor information from the wheel rotational speed generated from the rotation speed information of the drive motor is smaller than a preset value, using the wheel rotational speed generated from the rotation speed information of the drive motor, when the refresh rate of the wheel speed sensor information is lower than that of the rotation speed information of the drive motor.

16. The method for braking a vehicle according to claim 14, the method further comprising:
in a case when the refresh rate of the wheel speed sensor information is higher than that of the rotation speed information of the drive motor, the deviation of the wheel rotational speed generated from the wheel speed sensor information from the wheel rotational speed generated from the rotation speed information of the drive motor is smaller than a preset value, using the wheel rotational speed generated from the rotation speed information of the drive motor, when the refresh rate of the wheel speed sensor information is lower than that of the rotation speed information of the drive motor.

17. The method for braking a vehicle according to claim 13, wherein the drive motor drives a pair of drive wheels through a differential, the method further comprising:
speculating the wheel rotational speed of a drive wheel based on the rotation speed information of the drive motor and the wheel speed sensor information of the other drive wheel, when the wheel speed sensor information of one drive wheel of the pair of drive wheels is missed.

18. The method for braking a vehicle according to claim 13, wherein the at least one drive motor is at least one pair of drive motors, and wherein a pair of drive wheels of the vehicle are driven independently from each other, the method further comprising:
   generating the wheel rotational speed of the drive wheels according to the rotation speed information of the drive motors and the information of a driving torque transmission mechanism between the drive motors and the drive wheels.

19. The method for braking a vehicle according to claim 18, the method further comprising:
   using the wheel rotational speed of the drive wheel generated from the rotation speed information of the respective drive motor, when the wheel speed sensor information of one drive wheel is missed.

20. The method for braking a vehicle according to claim 13, wherein the control module comprises a redundant drive motor control unit, the method further comprising:
   controlling a motor drive by means of the redundant drive motor control unit when the drive motor controller fails.

* * * * *